United States Patent [19]
Iwabuchi et al.

[11] Patent Number: 6,045,075
[45] Date of Patent: Apr. 4, 2000

[54] LOW PROFILE DOUBLE BEARING REEL HAVING THUMB REST

[75] Inventors: Masakazu Iwabuchi; Ken'ichi Kawasaki, both of Sakai, Japan

[73] Assignee: Shimano, Inc., Japan

[21] Appl. No.: 09/165,165

[22] Filed: Oct. 1, 1998

[30] Foreign Application Priority Data

Oct. 9, 1997 [JP] Japan ................................. 9-276752

[51] Int. Cl.⁷ .......................... A01K 89/015; B65H 57/00
[52] U.S. Cl. ...................... 242/279; 242/310; 242/615.4; 242/157 R
[58] Field of Search ................................. 242/310, 278, 242/279, 281, 234, 619.3, 615.4, 157 R

[56] References Cited

U.S. PATENT DOCUMENTS

| | | | |
|---|---|---|---|
| 1,439,762 | 12/1922 | Russel | 242/278 |
| 2,057,178 | 10/1936 | Balz | 242/279 X |
| 2,141,726 | 12/1938 | Schafer | 242/279 |
| 2,160,175 | 5/1939 | Shakespeare, Jr. | 242/279 |
| 2,312,576 | 3/1943 | Nelson | 242/279 X |
| 4,789,114 | 12/1988 | Tanaka | 242/615.4 |
| 4,974,791 | 12/1990 | Miyazaki | 242/279 |
| 5,108,142 | 4/1992 | Puryear et al. | 242/310 X |
| 5,139,213 | 8/1992 | Furomoto | 242/279 |
| 5,669,566 | 9/1997 | Puryear | 242/234 |
| 5,855,331 | 1/1999 | Moimoto et al. | 242/310 |

*Primary Examiner*—Donald P. Walsh
*Assistant Examiner*—Emmanuel M. Marcelo
*Attorney, Agent, or Firm*—Jeffer, Mangels, Butler & Marmaro LLP

[57] ABSTRACT

A double-bearing reel includes a reel frame having an upper portion and a lower portion, a handle rotatably mounted on said reel frame, a spool rotatably mounted within the reel frame, a level winding mechanism, and a rotation-transmitting mechanism for transmitting rotation of the handle to the spool. The reel frame includes a mounting section provided in the lower portion for mounting on a fishing rod and a thumb-accommodating section provided in a front portion of the upper portion for gripping together with the fishing rod. The reel frame further has defined in the front portion between the thumb-accommodating section and the lower portion an opening for introducing a fishline into the reel. The spool is rotatably mounted within the reel frame behind the opening. The level winding mechanism has a line guide disposed between the opening and the spool, and a reciprocating motion mechanism for causing the line guide to move in a reciprocating fashion synchronously with rotation of the spool in at least one direction of rotation.

20 Claims, 7 Drawing Sheets

LOW PROFILE DOUBLE BEARING REEL HAVING THUMB REST

FIELD OF THE INVENTION

The present invention relates to a fishing reel, and more particularly to a double-bearing reel that is mounted on a fishing rod and that is designed for winding a fishline around an axis intersecting the axial direction of the fishing rod.

BACKGROUND OF THE INVENTION

A double-bearing reel commonly comprises a reel frame, a spool rotatably mounted on the reel frame, and a handle for rotating the spool. The reel frame has a pair of side plates facing each other across a prescribed gap. The spool comprises a line-winding drum fixed such that the spool axle passes through the center thereof, and discoid flanges provided at both ends of the line-winding drum. A level winding mechanism for the uniform winding of the fishline onto the spool is provided in front of the spool. The level winding mechanism has a line guide that moves back and forth in the axial direction of the spool, and this line guide reciprocates in the axial direction in response to the rotation of the spool, guiding the fishline onto the spool. The line guide is provided with a guide ring (made, for example, of a metal or ceramic) for ensuring contact with the fishline and guiding it onto the spool.

This type of double-bearing reel (and particularly a bait reel used for lure fishing) may have a round (circular) shape or a low-profile (oval) shape, depending on the shape of the reel frame as viewed from the side.

In addition, a round bait reel does not have space in front of the spool, so the line guide of the level winding mechanism is disposed adjacent to the front of the spool. When the line guide is disposed adjacent to the spool, and a fishline is guided by the guide ring within a narrow range, there is a danger that resistance acting on the fishline will increase due to variation in the diameter of the coil formed by the line, and that the throwing distance will decrease during casting. This is the reason that the guide ring of a round reel is provided with a vertically extending slit for guiding the fishline over a wide vertical range, reducing the increase in resistance due to variation in the diameter of the line coil.

A low-profile reel has ample space in front of the spool, so the line guide is disposed in the front portion of the reel frame at a distance from the spool. The front portion of such a reel frame is provided with an oblong opening for passing the fishline, and the guide ring is allowed to move across the area in which the opening is formed. When the line guide is disposed at a distance from the spool in such a manner, resistance due to variation in the diameter of the line coil on the spool does not increase as much, even when the fishline is guided by the guide ring within a narrow range. This is the reason that round holes are commonly formed in the guide rings of low-profile reels.

To cast a bait with the aid of such a bait reel, the fisherman, for example, grips the fishing rod with his right hand and swings the fishing rod while holding the spool steady with his thumb. To take the fishline back in, the fisherman grips the fishing rod and the reel with the entire palm of his left hand by enclosing them within his palm, and rotates the handle with his right hand. Because the reel frame of a round reel is limited to a circular shape, the reel frame is higher for the same diameter of the line coil on the reel, impeding palming. On the other hand, the reel frame of a low-profile reel has certain latitude in terms of shape, making it possible to facilitate palming by reducing the height of the reel frame. In view of this, the upper front portion of the fishing rod in front of the spool is provided with a thumb rest (thumb-accommodating section) consisting of a smooth surface to facilitate palming.

In the above-described conventional low-profile, double-bearing reels provided with thumb rests, a line guide is disposed in the front portion of the reel frame in order to reduce resistance acting on the fishline. Consequently, the spool and the line guide are disposed at a distance from each other, and the fishline is taken back in at a position removed from the line guide, making it difficult to stabilize the shape of the line coil on the spool. In addition, the height of the thumb rest provided to the upper front portion of the reel frame cannot be reduced below a certain level to avoid inhibiting the reciprocating movement of the line guide. As a result, the distance between the thumb rest and the fishing rod is increased during palming, it is more difficult to place the thumb on the thumb rest, and palming is impaired, particularly when the grip section of the fishing rod has a large diameter.

An object of the present invention is to stabilize the shape of the line coil, to reduce the height of the upper front portion of the reel frame, and to facilitate palming in a low-profile, double-bearing reel equipped with a thumb rest.

SUMMARY OF THE PREFERRED EMBODIMENTS

In accordance with one aspect of the present invention, there is provided a double-bearing reel that is mounted on a fishing rod and is designed for winding a fishline around an axis intersecting the axial direction of the fishing rod. The reel comprises a reel frame, a handle, a spool, a level winding mechanism, and a rotation-transmitting mechanism. The reel frame comprises a mounting section provided in the lower portion for mounting on the fishing rod, a thumb-accommodating section provided in a front portion of the upper portion for gripping together with the fishing rod, and an opening formed in the front portion between the thumb-accommodating section and the lower portion for introducing the fishline into the interior. The handle is mounted on the reel frame while allowed to rotate about the intersecting axis. The spool is mounted in the reel frame behind the opening while allowed to rotate about the intersecting axis, and the fishline is wound around the outer circumference thereof. The level winding mechanism comprises a line guide that is provided between the opening and the spool while allowed to move in the axial direction of the spool near this spool, and that is intended for the fishline introduced through the opening to be guided onto the spool; and a reciprocating motion mechanism for causing the line guide to move in a reciprocating fashion synchronously with the rotation of the spool in at least one direction of rotation. The rotation-transmitting mechanism transmits the rotation of the handle to the spool.

To perform casting with the aid of such a double-bearing reel, the fisherman allows the spool to rotate freely, holds the fishing rod with his right hand, for example, and swings the fishing rod while holding the spool steady with his thumb. When this is done, the fishline is paid out from the spool under the weight of the lure, escaping through the opening from the line guide. To take the fishline back in after the lure has been cast into the water, the fisherman, for example, grips the reel and the fishing rod and operates the handle with his right hand by placing the thumb of his left hand on the thumb-accommodating section to perform palming. When this is done, the fishline entering through the opening is guided by the line guide (which moves back and forth in the axial direction of the spool) and is uniformly wound onto the spool.

In this case, the line guide is placed close to the spool rather than in the front portion of the reel frame, preventing the reciprocating motion of the line guide from being impeded even when the front portion of the reel frame has low height. It is therefore possible to reduce the height of the front portion of the reel frame (which is provided with a thumb-accommodating section), making it easier for the fisherman to place his thumb on the thumb-accommodating section during palming, and facilitating palming operations. In addition, placing the line guide close to the spool allows the fishline to form a stable coil and reduces shifting.

In a preferred embodiment, at least part of the inner circumferential surface of the opening in the reel is covered with at least one hard cover member. In this case, placing the line guide adjacent to the spool makes it less likely that the opening will be damaged when the fishline from the line guide vibrates and comes into contact with the opening, because at least part of the opening is covered with at least one hard cover member.

In a more particular preferred embodiment, the foregoing cover member is made of metal. In this case, fashioning the cover members from metal makes it possible to obtain opening-conforming shapes in a simple manner by performing various types of processing even when the opening has a complex shape, allowing the portions of the opening in contact with the fishline to be safely protected.

In another more particular preferred embodiment, the foregoing cover member is made of a hard ceramic. In this case, fashioning the cover members from a hard ceramic makes it less likely that the opening will be damaged by contact with the fishline, and prevents the opening area from being corroded by adhered moisture.

In an additional more specific preferred embodiment, the surfaces of the cover members mentioned above are coated with metal or a metal nitride. Use of a metal makes it less likely that the opening will be damaged and reduces resistance during contact. Use of a metal nitride, such as titanium nitride further reduces the likelihood of damage to the opening and makes it less likely that corrosion will be caused by adhered moisture.

In a further specific preferred embodiment, the surfaces of the cover members mentioned above are coated with a ceramic. In this case, forming a hard and smooth ceramic coating further reduces the likelihood of damage to the opening and lowers resistance during contact. In addition, the opening is less likely to be corroded even when readily corroded materials are used for the cover members.

According to another preferred embodiment, the line guide for the inventive reel has a guide ring designed for line guiding and provided with a vertically extending slit. In this case, resistance acting on the fishline is less likely to increase when the line guide is disposed adjacent to the spool and the diameter of the line coil fluctuates.

In a more specific preferred embodiment, the foregoing guide ring for the inventive reel is comprised of a metal wire folded into a hairpin shape. In this case, the structure of the guide ring is simplified by the use of an annular member made of a ceramic or the like.

Preferably, the foregoing guide ring has a surfact that is coated with a metal or a metal nitride. In this case, forming a hard and smooth metal coating makes it less likely that the guide ring will be damaged and reduces resistance during contact.

In another specific preferred embodiment, the foregoing guide ring has a surface that is coated with a ceramic. In this case, forming a hard and smooth ceramic coating makes it less likely that the guide ring will be damaged and reduces resistance during contact. In addition, the guide ring is less likely to be corroded even when a readily corroded material is used for the guide ring.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
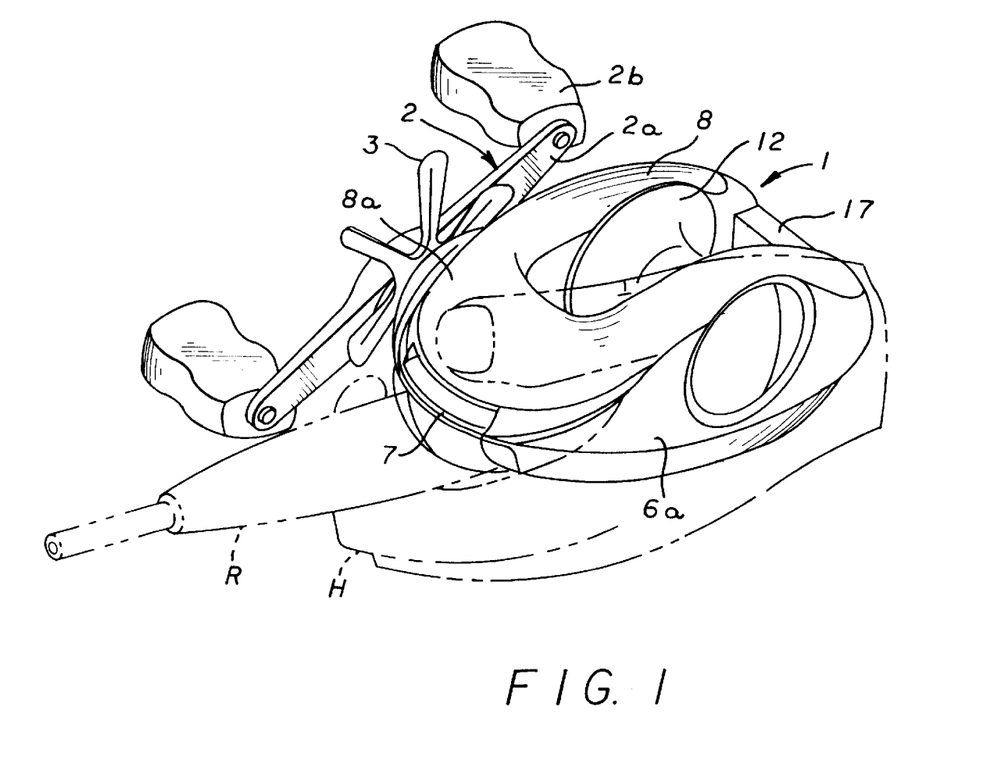
FIG. 1 is a perspective view of a double-bearing reel according to a preferred embodiment of the present invention.
Figure 2:
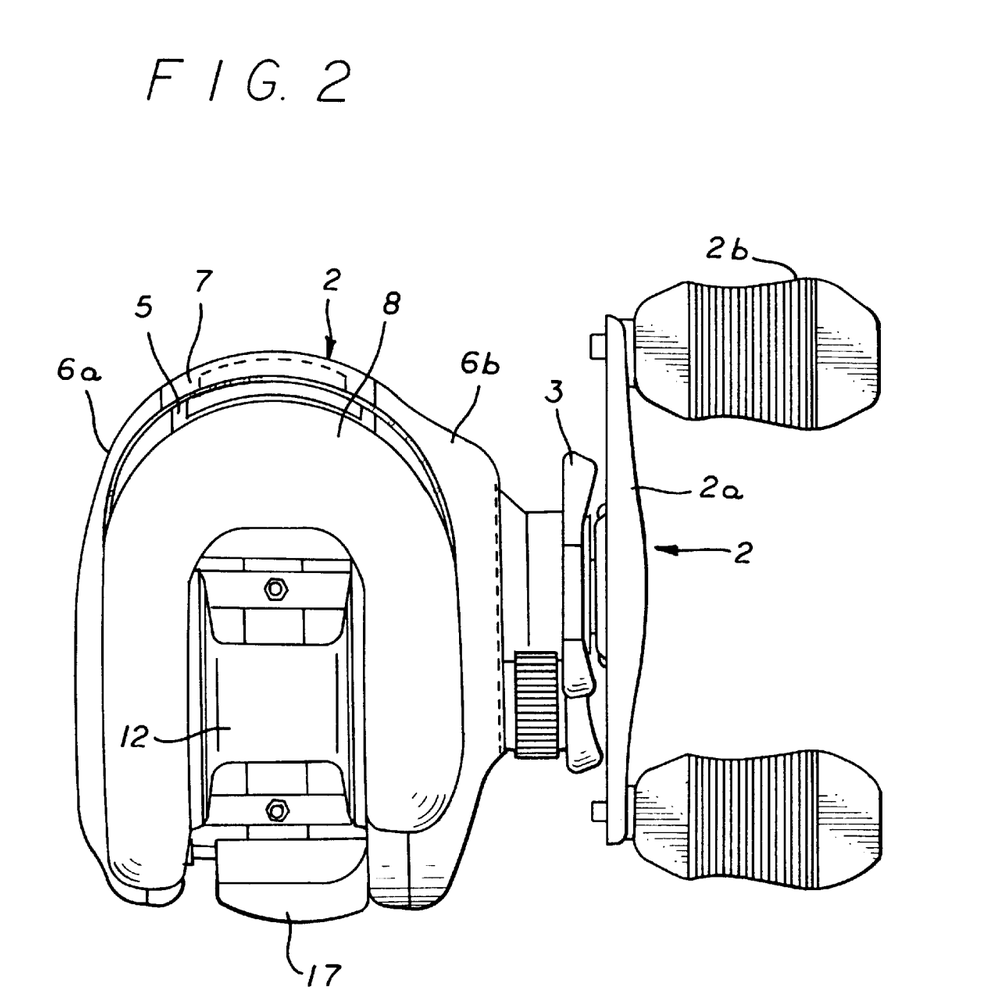
FIG. 2 is a plan view of the embodiment of FIG. 1.

In FIGS. 1 and 2, the double-bearing reel according to an embodiment of the present invention is a low-profile reel for bait casting. This reel comprises a reel frame 1, a handle 2 designed for spool rotation and disposed laterally in relation to the reel frame 1, and a star drag 3 designed for drag adjustment and disposed on that side of the handle 2 which faces the reel frame 1. The handle 2 is shaped as a double handle composed of a flat arm 2a and of handles 2b rotatably mounted on the two ends of the arm 2a. The outer surface of the arm 2a is made smooth and devoid of joints to prevent the fishline from being entangled.

Figure 3:
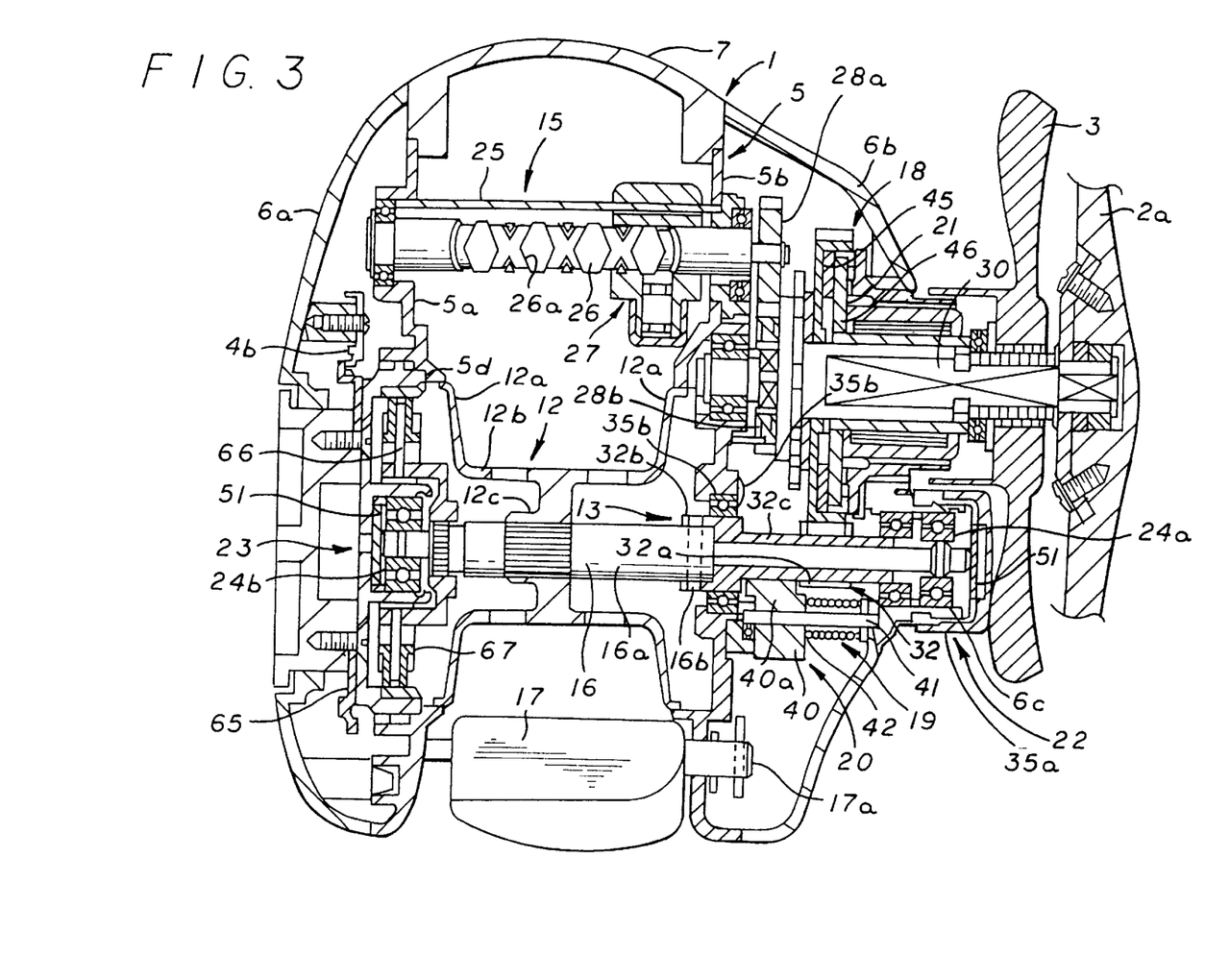
FIG. 3 is a cross section of the embodiment of FIG. 1.

As shown in FIG. 3, the reel frame 1 comprises a frame 5 as well as a first lateral cover 6a and second lateral cover 6b disposed on both sides of the frame 5. In addition, the reel frame 1 comprises a front cover 7 for covering the front, and a thumb rest 8 for covering the upper portion, as shown in FIGS. 1 and 2.

Figure 4:
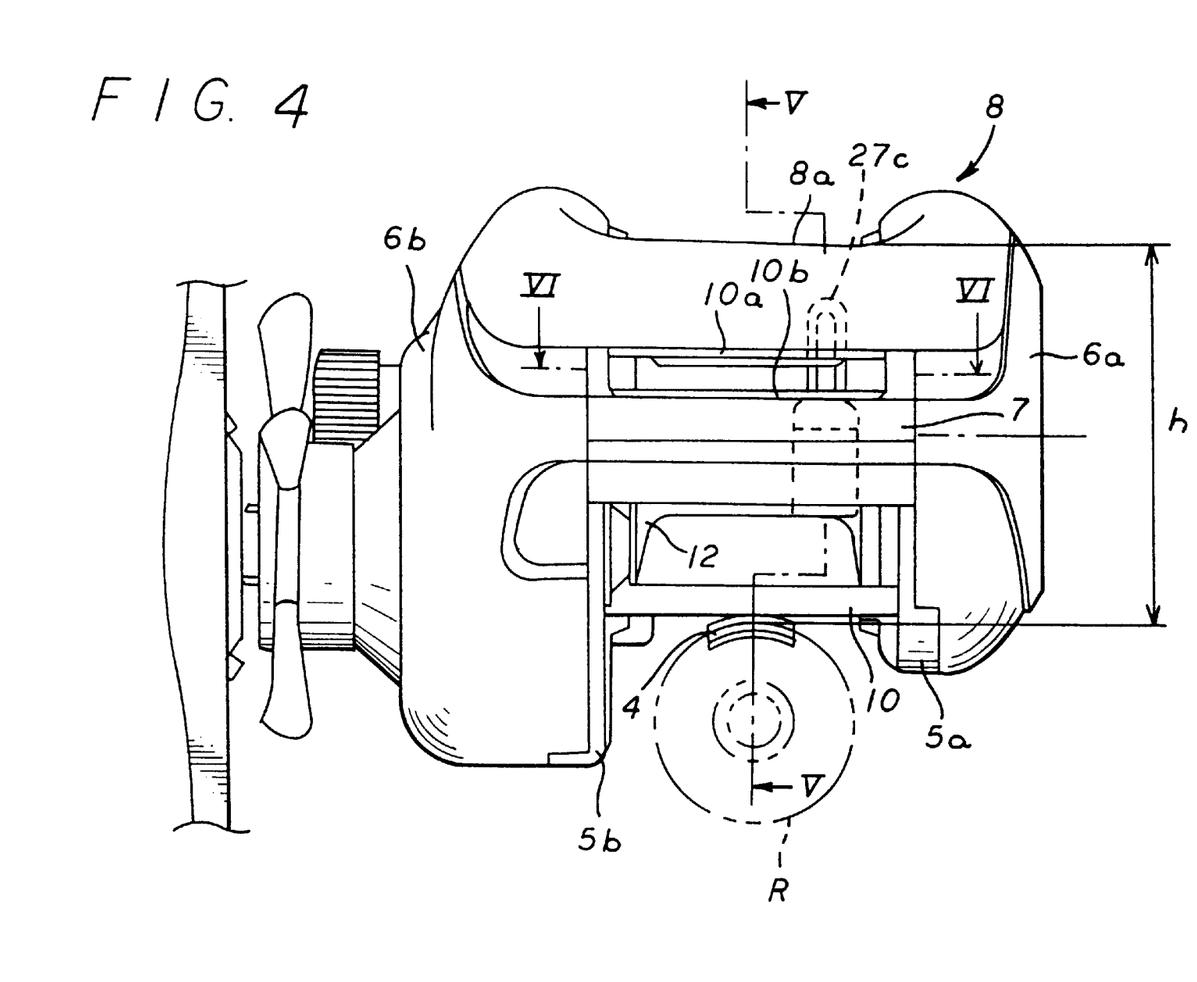
FIG. 4 is a front view of the embodiment of FIG. 1.
Figure 5:
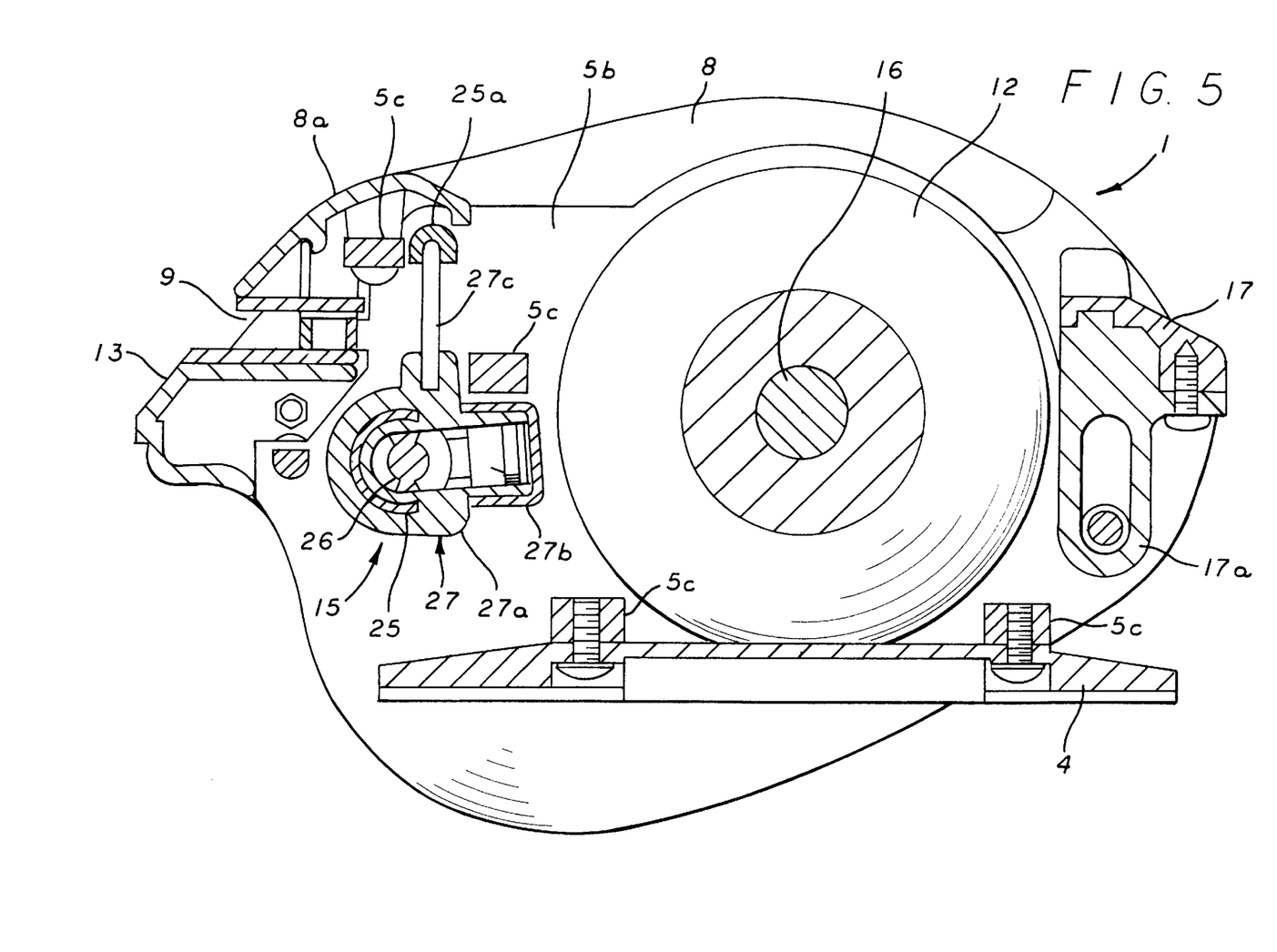
FIG. 5 is a sectional view along line V—V in FIG. 4.

As shown in FIG. 3, the frame 5 comprises a pair of side plates 5a and 5b, which are disposed facing each other across a prescribed interval, and a plurality of connecting components 5c (see FIG. 5) for connecting the side plates 5a and 5b. As shown in FIGS. 4 and 5, a longitudinally extending mounting leg 4 made of stainless steel or another metal and designed for mounting the reel on the fishing rod R is screwed to the two lower connecting components 5c.

The first lateral cover 6a, while allowed to move a prescribed distance in the axial direction, is pivotally mounted on the side plate 5a with the aid of a rockshaft (not shown) disposed in the front ends of the side plates 5a and 5b. The first lateral cover 6a can thus open and close in relation to the side plate 5a. The second lateral cover 6b is screwed with a small screw to the side plate 5b.

As shown in FIGS. 4 through 7, the front cover 7 is mounted between the side plates 5a and 5b in the front portion of the reel frame 1. The front cover 7 is equipped with an opening 9, which is formed in the front portion (i.e., in the front of the reel frame 1) in relation to the thumb rest 8 positioned above. The opening 9 is a crosswise slit designed to accommodate the fishline. However, a guide ring 27c facing the opening 9 is absent from conventional double-bearing reels, reducing the vertical width W (see FIG. 7). Upper and lower cover members 10a and 10b made, for example, of silicon nitride, zirconia, or another hard ceramic material and provided with a smooth surface are mounted on the upper and lower portions of the inner circumferential surface of the opening 9, that is, in the lower front portion of the thumb rest 8 and on the upper surface of the front cover 7, respectively.

Figure 6:
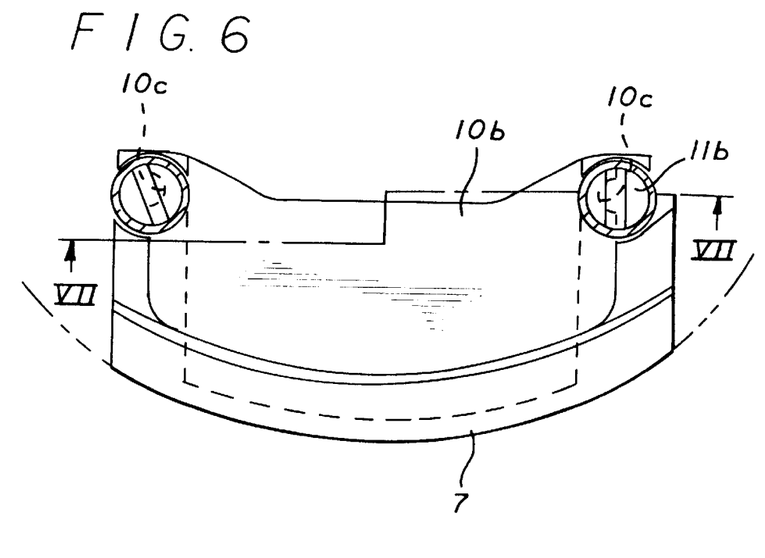
FIG. 6 is a plan view of the front cover of the embodiment of FIG. 1.
Figure 7:
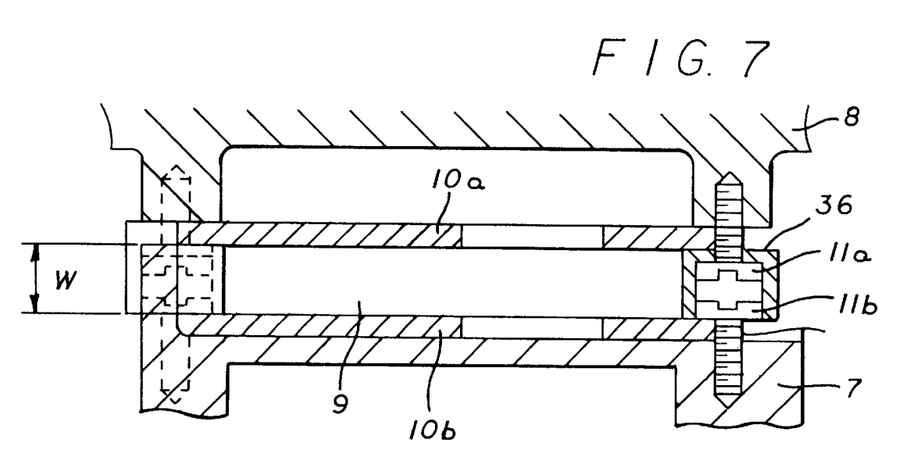
FIG. 7 is a sectional view along line VII—VII in FIG. 6.

As shown in FIGS. 6 and 7, the cover members 10a and 10b are designed to prevent the opening 9 (which has a small vertical width W) from being damaged when the fishline comes into contact with the opening 9, and to reduce resistance acting on the contacting fishline. The cover members 10a and 10b are fixed by fixing bolts 11a and 11b to the thumb rest 8 and the front cover 7, respectively. Because the upper and lower cover members 10a and 10b described herein are made of ceramic, there is a danger that they will fracture if through holes are formed for the bolts. This is the reason that the fixing bolts 11a and 11b are passed through depressions 10c, which are cut out in the form of semicircular arcs on both sides, and the cover members 10a and 10b are thus joined to the thumb rest 8 and the front cover 7. The surfaces of the cover members 10a and 10b preferably are coated with a hard material, for example a metal or a metal nitride such as titanium nitride. Coating may be performed by spraying, CVD (chemical vapor deposition), PVD (physical vapor deposition), or another known method for forming thin films.

A cap 36 made, for example, of stainless steel is disposed between the cover member 10a and the head portion of the fixing bolt 11a for joining the cover member 10a to the thumb rest 8. The length of the cap 36 is equal to the width W of the opening so as to additionally cover the head portion of the fixing bolts 11a and 11b. This arrangement provides protection not only for the top and bottom sections of the inner circumferential surface of the opening 9, but also for the left and right sections thereof. The surface of the cap 36 is also preferably coated with a hard material, such as a metal, metal nitride or ceramic.

As shown in FIGS. 1, 2, and 4, the thumb rest 8 encompasses the upper portion of the reel frame 1, forming a U-shape in plan view. Palming is performed by placing the thumb of the hand H (see FIG. 1) holding the fishing rod on the front portion 8a of the thumb rest 8. The upper surface of the thumb rest 8 is formed from curved surfaces bent to form upward convexities. The height h (see FIG. 4) of the front portion of the thumb rest 8 above the mounting leg 4 is less than that of a conventional double-bearing reel.

As shown in FIG. 3, the following components are disposed inside the frame 5: a spool 12, disposed in a direction orthogonal to the fishing rod R; a level winding mechanism 15 for the uniform winding of the fishline inside the spool 12; and a clutch lever 17 for accommodating the thumb during thumbing. In addition, the following components are disposed between the frame 5 and the second lateral cover 6b: a gear mechanism 18 for transmitting the rotational force from the handle 2 to the spool 12 and the level winding mechanism 15; a clutch mechanism 13; a clutch disengagement mechanism 19 disengaging the clutch mechanism 13; a disengagement control mechanism 20 for controlling the disengagement of the clutch mechanism in accordance with the operation of the clutch lever 17; a drag mechanism 21; and a casting control mechanism 22 for adjusting resistance during the rotation of the spool 12. In addition, a centrifugal braking mechanism 23 for reducing the backlash during casting is disposed between the frame 5 and the first lateral cover 6a.

The spool 12 has diskoid flanges 12a on both sides thereof, and a cylindrical line-winding drum 12b is placed between the two flanges 12a. The spool 12 also has a cylindrical boss 12c, which is formed as an integral part substantially in the center of the line-winding drum 12b in the axial direction on the inner circumferential side thereof, and the spool is nonrotatably fixed (for example, by a serrated joint) to a spool axle 16 passing through the boss 12c. The fixing method is not limited to the use of serrated joints alone and may also include using keyed joints, splined joints, and other connections.

The spool axle 16 passes through the side plate 5b and extends outward beyond the second lateral cover 6b. The extended end is rotatably supported by a bearing 24a in a boss 6c formed in the second lateral cover 6b. The other end of the spool axle 16 is rotatably supported by a bearing 24b in the centrifugal braking mechanism 23. The bearings 24a and 24b are sealed ball bearings.

The right end of the large-diameter section 16a of the spool axle 16 is disposed in the through-passage portion of the side plate 5b, and an engagement pin 16b constituting part of the clutch mechanism 13 is fixed therein. The engagement pin 16b passes through the large-diameter section 16a along its diameter, and the two ends thereof project in the radial direction.

As shown in FIGS. 3 and 5, the level winding mechanism 15 comprises a guide tube 25 fixed between the two side plates 5a and 5b, a worm shaft 26 rotatably supported inside the guide tube 25, and a line guide 27.

The guide tube 25, which is a cylindrical member in which the circumferential surface of the back section has been cut out along the entire length thereof, guides the line guide 27 in the axial direction (direction orthogonal to the fishing rod R) of the spool axle 16.

The worm shaft 26 is a shaft for causing the line guide 27 to move in a reciprocating fashion in the axial direction of the spool axle 16. A gear 28a, which is part of the gear mechanism 18, is fixed to the end section of the worm shaft 26. In addition, intersecting helical grooves 26a are formed on the worm shaft 26.

The line guide 27 comprises a guide frame 27a, a latch pin 27b rotatably mounted on the guide frame 27a, and a guide ring 27c extending upward from the top portion of the guide frame 27a. A U-shaped through hole for accommodating the guide tube 25 is formed parallel to the spool axle 16 in the guide frame 27a, and the guide frame 27a is supported on the guide tube 25 while allowed to move in the axial direction. The latch pin 27b is disposed in the back section of the guide frame 27a in a substantially longitudinal direction, and the tip thereof is caught in the grooves 26a of the worm shaft 26. The latch pin 27b is caused to rotate along the grooves 26a by the rotation of the worm shaft 26, forcing the guide frame 27a to move in a reciprocating manner. The guide ring 27c is obtained by bending, for example, a stainless steel wire into an upwardly convex hairpin shape, and a slit is formed around the inside thereof. The guide ring 27c is fixed by the insertion of the lower portion thereof into the upper surface of the back section of the guide frame 27a. The surface of the guide ring 27c is coated with a metal or a metal nitride, such as titanium nitride, or with SiC or another ceramic, yielding a smooth and hard surface. The guide ring 27c is disposed adjacent to the spool 12 between the opening 9 and the spool 12. The upper portion of the guide ring 27c is guided parallel to the spool axle 16 by a guide shaft 25a provided with a guide groove in its lower portion. The guide shaft 25a is disposed above the guide tube 25 parallel to this tube, and both ends thereof are fixed in the side plates 5a and 5b. The height H of the front portion 8a of the thumb rest 8 of the reel frame 1 can thus be reduced, and palming facilitated, by placing the high guide ring 27c close to the spool 12.

In the level winding mechanism 15, the line guide 27 is forced to move in a reciprocating fashion along the guide tube 25 by causing the worm shaft 26 to rotate via the gear mechanism 18. The fishline is introduced into the guide ring 27c of the line guide 27 and is uniformly wound onto the spool 12.

The gear mechanism 18 comprises a handle shaft 30, a main gear 31 fixed on the handle shaft 30, a cylindrical pinion gear 32 meshing with the main gear 31, a gear 28a fixed on the end portion of the aforementioned worm shaft 26, and a gear 28b that is nonrotatably fixed on the handle shaft 30 and that meshes with the gear 28a. In terms of its vertical position, the handle shaft 30 of the gear mechanism 18 is disposed lower than in the past in order to reduce the height of the thumb rest 8. This is the reason that the lower portions of the side plate 5b and the second lateral cover 6b serving as a housing for the gear mechanism 18 are disposed below the lower portions of the side plate 5a and the first lateral cover 6a.

As shown in FIG. 3, the pinion gear 32, which is mounted on the spool axle 16 while allowed to move in the axial direction, is a cylindrical member that extends inward from the outside of the side plate 5b and that is designed such that the spool axle 16 passes through its center. In addition, the two ends of the pinion gear 32 are rotatably supported by bearings 35a and 35b in the boss 6c and the side plate 5b while allowed to move in the axial direction. These bearings 35a and 35b are also sealed ball bearings.

The pinion gear 32 comprises a toothed section 32a, which is formed in the outer circumferential portion on the right side in FIG. 3 and is meshed with the main gear 31; a meshing section 32b formed on the other side; and a constricted section 32c formed between the toothed section 32a and the meshing section 32b. The meshing section 32b, which consists of a groove formed in the end face of the pinion gear 32 in the radial direction, catches the engagement pin 16b, which is fixed by being passed through the spool axle 16. In this arrangement, the rotational force from the handle shaft 30 is not transmitted to the spool 12 when the pinion gear 32 moves outward, disengaging the meshing section 32b and the engagement pin 16b of the spool axle 16. The clutch mechanism 13 is composed of the meshing section 32b and the engagement pin 16b. Engagement of the engagement pin 16b and the meshing section 32b allows torque to be transmitted directly from the pinion gear 32 (whose diameter is larger than that of the spool axle 16) to the spool axle 16, reducing torsional deformation and improving torque transmission efficiency.

As shown in FIG. 2, the clutch lever 17 is disposed behind the spool 12, in the back section between the two side plates 5a and 5b. Slits (not shown) are formed in the side plates 5a and 5b of the frame 5, and the axle 17a of the clutch lever 17 is rotatably supported in these slits. The clutch lever 17 can therefore slide up and down along these slits.

As shown in FIG. 3, the clutch disengagement mechanism 19 has a clutch yoke 40. The clutch yoke 40 is disposed around the outside of the spool axle 16 and is movably supported parallel to the axial center of the spool axle 16 by two pins 41 (only one is shown). The spool axle 16 can rotate in relation to the clutch yoke 40. Specifically, the clutch yoke 40 does not rotate when the spool axle 16 rotates. An engagement component 40a for engaging the constricted section 32c of the pinion gear 32 is provided in the central portion of the clutch yoke 40. In addition, a spring 42 is disposed between the clutch yoke 40 and the second lateral cover 6b along the outer circumferences of the pins 41 supporting the clutch yoke 40. The clutch yoke 40 is constantly pushed inward by the spring 42.

In a normal state, the pinion gear 32 of the structure is disposed in an internal position of clutch engagement, causing the meshing section 32b and the engagement pin 16b of the spool axle 16 to become engaged and establishing a "clutch on" state. When, however, the pinion gear 32 is moved outward by the clutch yoke 40, the meshing section 32b and the engagement pin 16b become disengaged, and a "clutch off" state is established.

The drag mechanism 21 comprises a friction plate 45 pressed against the main gear 31, and a pressure plate 46 for pressing the friction plate 45 with a prescribed force against the main gear 31 by the rotation of the star drag 3.

The casting control mechanism 22 comprises a plurality of friction plates 51 disposed such that they sandwich the two ends of the spool axle 16, and a cap 52 for adjusting the force with which the spool axle 16 is gripped by the friction plates 51. The friction plates 51 on the left are housed inside a brake case 65.

As shown in FIG. 3, the centrifugal braking mechanism 23 comprises the brake case 65, a rotary component 66 installed inside the brake case 65, and sliders 67 that are mounted while allowed to move in the radial direction and that are disposed at regular intervals in the circumferential direction on the rotary component 66. The brake case 65 is detachably mounted with the aid of a bayonet structure in a circular opening 5d formed in the side plate 5a.

The operation of the foregoing preferred embodiment of the inventive reel will now be described.

When casting is performed, the braking force is adjusted with the aid of the cap 52 in order to reduce backlash. The clutch lever 17 is then pushed down. In this case, the clutch lever 17 moves to a lower disengagement position along the slits in the side plates 5a and 5b. The movement of the clutch lever 17 causes the clutch yoke 40 to move outward, and the pinion gear 32 engaging the clutch yoke 40 to move in the same direction. In this state, the meshing section 32b of the pinion gear 32 and the engagement pin 16b of the spool axle 16 are no longer meshed together, and a "clutch off" state is established. In this state, rotation from the handle shaft 30 is not transmitted to the spool 12 or the spool axle 16, and the spool 12 is in a freely rotating state. A lure is cast and the spool 12 is vigorously rotated in the line payout direction when the clutch is off and when the reel is inclined in the axial direction (and the fishing rod is swung) in such a way that the spool axle 16 is aligned in the vertical direction while the spool is held with a thumb placed on the clutch lever 17. As a result, the fishline is paid out from the opening 9 through the guide ring 27c. In the process, the fishline sometimes comes into contact with the guide ring 27c or the cover members 10a and 10b of the opening 9. However, both the guide ring 27c and the opening 9 have high hardness and are not abraded by contact with the fishline.

To take the fishline back in after the lure has been cast into the water, the fisherman, for example, grips the reel and the fishing rod and operates the handle 2 with his right hand by placing the thumb of his left hand on the thumb rest 8 to perform palming. The fishline entering through the opening 9 is guided by the guide ring 27c (which moves back and forth in the axial direction of the spool) and is uniformly wound onto the spool 12. At this time, similar to casting, the fishline occasionally comes into contact with the guide ring 27c or the cover members 10a and 10b of the opening 9. Both the guide ring 27c and the opening 9, however, have high hardness and are not abraded by contact with the fishline.

Figure 8:
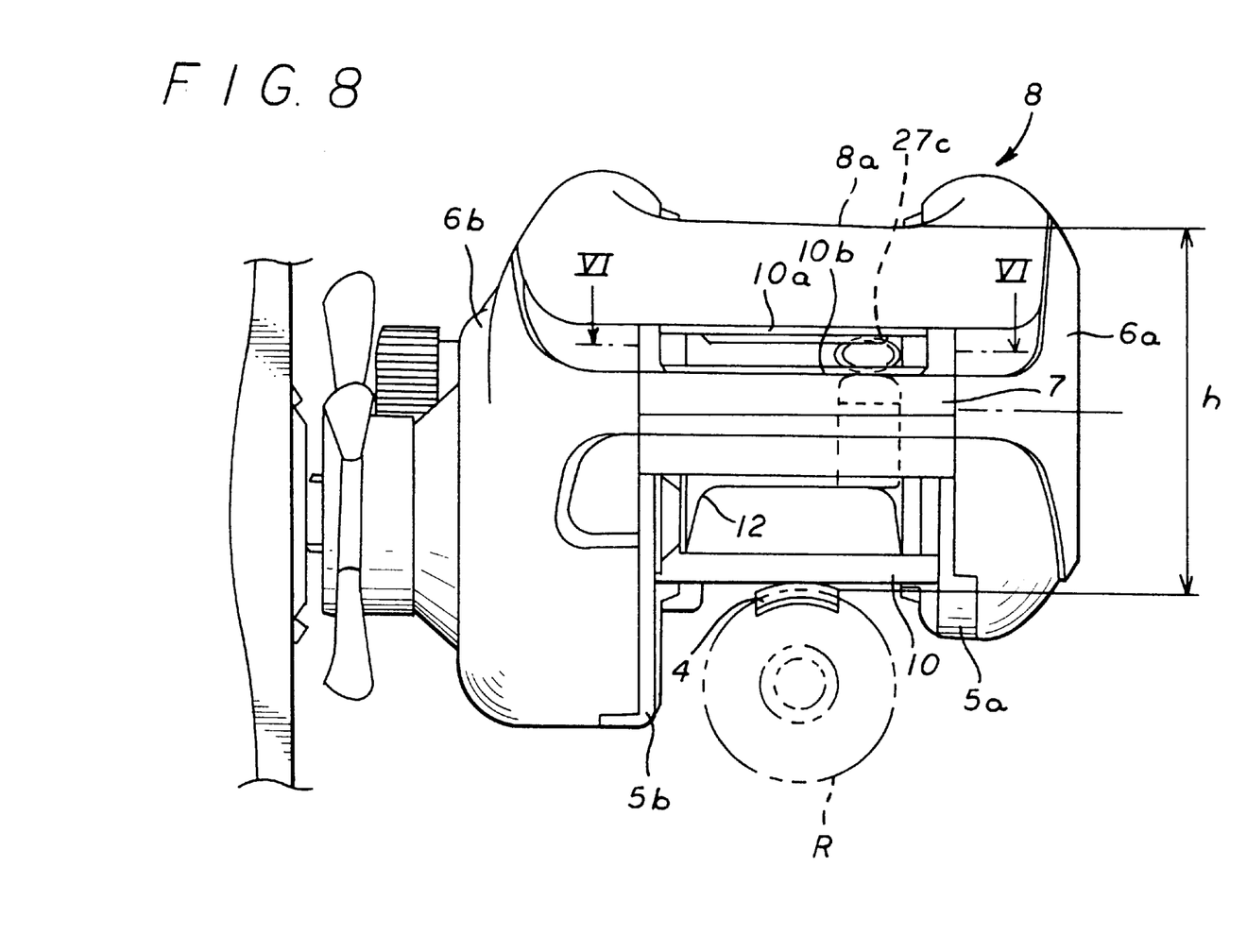
FIG. 8 is a front view of the embodiment of FIG. 1 including an elliptical guide ring.

The present invention can be practiced other than according to the specific preferred embodiments described herein. For example, the shape of the thumb rest 8 is not limited to that described in the above embodiment and may also include various other smooth shapes. The structure of the line guide 27 is not limited to the above embodiment. It is also possible to provide a product obtained by shaping a ceramic or other member into an elliptic guide ring 27c, as shown in FIG. 8. The material of the cover members 10a and 10b is not limited to a ceramic and may also include stainless steel, titanium alloys, and other materials. It is also possible to coat the surfaces with a ceramic or with titanium nitride or another type of hard material.

According to the present invention, a line guide is placed close to the spool rather than in the front portion of the reel frame, preventing the reciprocating motion of the line guide from being impeded even when the front portion of the reel frame has low height. It is therefore possible to reduce the height of the front portion of the reel frame (which is provided with a thumb-accommodating section), making it easier for the fisherman to place his thumb on the thumb-accommodating section during palming, and facilitating palming operations. In addition, placing the line guide close to the spool allows the fishline to form a stable coil and reduces shifting.

What is claimed is:

1. A double-bearing reel comprising:
   (a) a reel frame having an upper portion and a lower portion, said reel frame including a mounting section provided in said lower portion for mounting on a fishing rod and a thumb-accommodating section provided in a front portion of said upper portion for gripping together with said fishing rod, said reel frame further having defined in said front portion between said thumb-accommodating section and said lower portion an opening for introducing a fishline into said reel;
   (b) a handle rotatably mounted on said reel frame;
   (c) a spool rotatably mounted within said reel frame behind said opening;
   (d) a level winding mechanism having (i) a line guide, said line guide being disposed between said opening and said spool, and defining a vertical axis, and (ii) a reciprocating motion mechanism for causing said line guide to move in a reciprocating fashion synchronously with rotation of said spool in at least one direction of rotation;
   wherein a substantial portion of said thumb-accommodating section extends forwardly of said vertical axis defined by said line guide, whereby said opening is defined forwardly of said line guide, and
   (e) a rotation-transmitting mechanism for transmitting rotation of said handle to said spool.

2. A double-bearing reel as defined in claim 1 wherein said opening has an inner circumferential surface at least a part of which is covered with at least one hard cover member.

3. A double-bearing reel as defined in claim 2 wherein said at least one hard cover member is made of metal.

4. A double-bearing reel as defined in claim 2 wherein said at least one hard cover member is made of a hard ceramic.

5. A double-bearing reel as defined in claim 2 wherein said at least one hard cover member has a surface coated with a metal or a metal nitride.

6. A double-bearing reel as defined in claim 5 wherein said surface is coated with titanium nitride.

7. A double-bearing reel as defined in claim 2 wherein said at least one hard cover member has a surface coated with a ceramic.

8. A double-bearing reel as defined in claim 1, wherein said line guide comprises a guide ring provided with a vertically extending slit.

9. A double-bearing reel as defined in claim 8, wherein said guide ring is comprised of a metal wire folded into a hairpin shape.

10. A double-bearing reel as defined in claim 9, wherein said guide ring has a surface coated with a metal or a metal nitride.

11. A double-bearing reel as defined in claim 9, wherein said guide ring has a surface coated with a ceramic.

12. A double-bearing reel comprising:
    (a) a reel frame having a front portion provided with a thumb-accommodating section, wherein an opening is defined in said front portion below said thumb-accommodating section;
    (b) a handle rotatably mounted on said reel frame;
    (c) a spool rotatably mounted within said reel frame behind said opening;
    (d) a level winding mechanism movable in a reciprocating fashion synchronously with rotation of said spool in at least one direction of rotation, said level winding mechanism having a line guide that is disposed between said opening and said spool, said line guide defining a vertical axis, wherein said opening is defined forwardly of said line guide, and wherein a substantial portion of said thumb-accommodating section extends forwardly of said vertical axis; and
    (e) a rotation-transmitting mechanism that transmits rotation of said handle to said spool.

13. A double-bearing reel as defined in claim 12 wherein said opening has an inner circumferential surface at least a part of which is covered with at least one cover member.

14. A double-bearing reel as defined in claim 13 wherein said at least one cover member is made of a material selected from the group consisting of a metal, a metal nitride and a ceramic.

15. A double-bearing reel as defined in claim 13 wherein said at least one cover member has a surface coated with a material selected from the group consisting of a metal, a metal nitride and a ceramic.

16. A double-bearing reel as defined in claim 12 wherein said line guide comprises a guide ring.

17. A double-bearing reel as defined in claim 16 wherein said guide ring is comprised of a material selected from the group consisting of a metal, a metal nitride and a ceramic.

18. A double-bearing reel as defined in claim 17 wherein said guide ring is formed from a metal wire folded into a hairpin shape.

19. A double-bearing reel as defined in claim 17 wherein said guide ring is formed from a ceramic material and has an elliptic shape.

20. A double-bearing reel as defined in claim 16 wherein said guide ring has a surface coated with a material selected from the group consisting of a metal, a metal nitride and a ceramic.

* * * * *